March 11, 1958 A. E. NEUMANN 2,826,490
BATTERY RECLAIMING METHOD
Original Filed June 4, 1953 3 Sheets-Sheet 1

INVENTOR
Arthur E. Neumann

BY Bacon & Thomas
ATTORNEYS

INVENTOR
Arthur E. Neumann

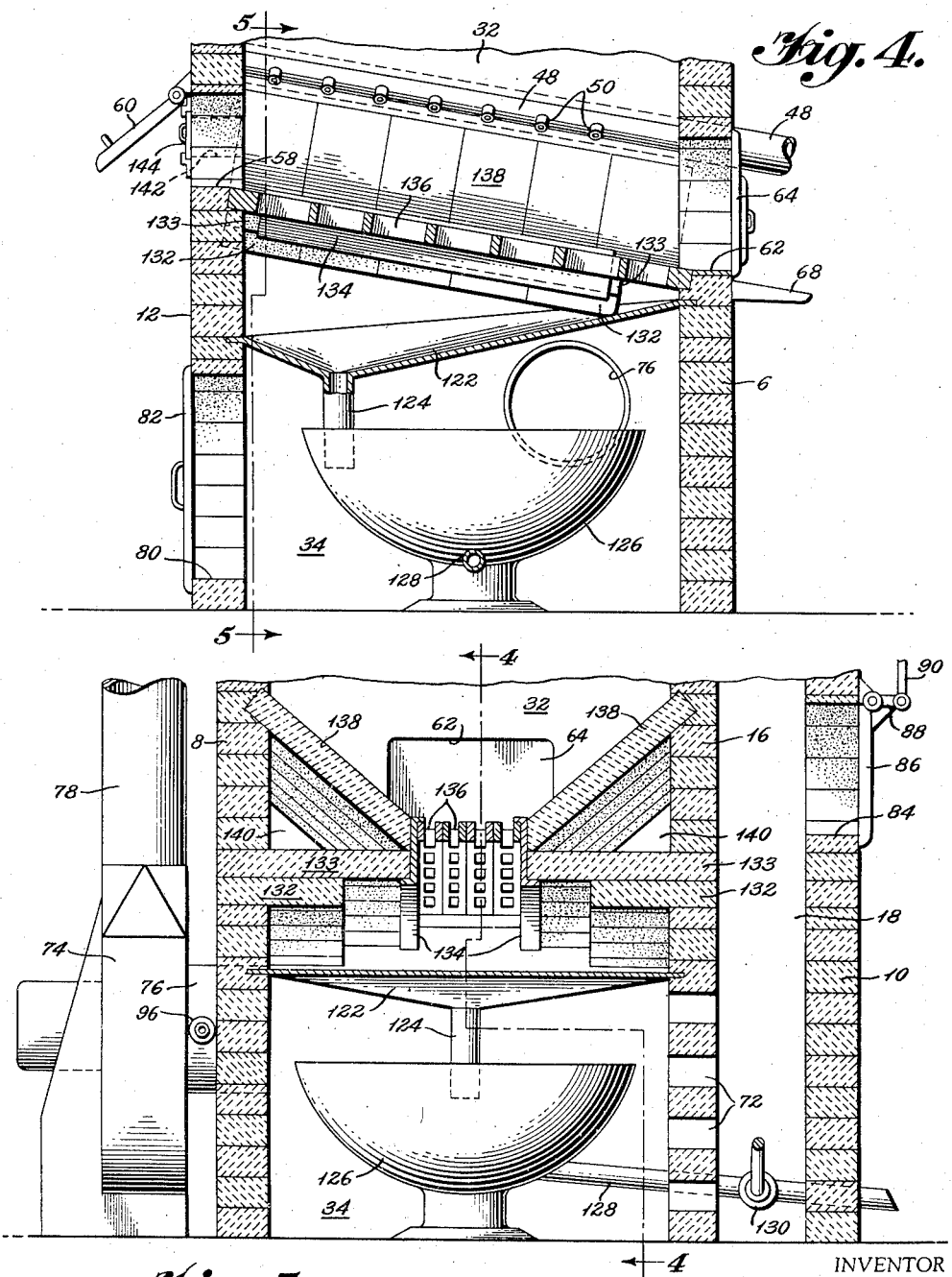

United States Patent Office 2,826,490
Patented Mar. 11, 1958

2,826,490

BATTERY RECLAIMING METHOD

Arthur E. Neumann, Chicago, Ill., assignor of one-half to Frank Scoby, Chicago, Ill.

Original application June 4, 1953, Serial No. 359,623, now Patent No. 2,756,044, dated July 24, 1956. Divided and this application April 9, 1956, Serial No. 583,604

9 Claims. (Cl. 75—77)

This invention relates to a method for the recovery of metals from articles containing metals and combustible materials, but more particularly to a method for the recovery of metallic lead from discarded storage batteries.

This application is a division of my copending application Serial No. 359,623, for "Battery Reclaiming Furnace," filed June 4, 1953, now U. S. Patent No. 2,756,044, issued July 24, 1956.

It has heretofore been proposed to recover lead from storage batteries by burning the battery cases and utilizing the heat so released to melt the metallic lead components of the batteries. Previous attempts, however, have proven unsuccessful because the battery cases are made principally of rubber and their burning results in the production of excessive smoke and highly unpleasant odors contaminating the entire neighborhood.

The present invention utilizes the heat released by burning of the battery cases to melt the lead but the method also includes the feature of projecting turbulent air onto the burning cases to produce smokeless and odorless burning thereof and complete combustion of the combustible materials with a minimum of excess air, thus insuring complete combustion without smoke.

The combustible materials in the battery cases are capable of releasing many (approximately 4) times the heat necessary to melt the contained metallic lead and the present invention utilizes the excess heat to maintain the collected molten lead in a liquid state until conveyed to suitable molds or otherwise disposed of. The invention consists of a furnace construction particularly adapted to receive discarded and drained storage batteries and provides a combustion chamber with means therein to project the turbulent air onto the battery cases as they burn. The batteries are supported on a grate or rail structure through which the melted lead drips into a collecting pan. The hot gases resulting from the combustion are directed to a chamber surrounding the collecting pan and maintain the molten lead therein in a liquid state as long as the furnace is in operation.

It is therefore the general object of this invention to provide a method for recovering metals from articles containing said metals and combustible materials by utilizing the heat of combustion of the combustible materials to melt the metals for recovery.

Another object of this invention is to utilize part of the excess heat of combustion to maintain the recovered metal in a molten state.

Still another object of this invention is to provide a method for the recovery of such metals wherein oxidation of the molten metal is reduced to a minimum.

Still another object of this invention is to provide a method for the recovery of such metals and the method of operating apparatus including conduits and a control valve for withdrawing molten metals from the furnace wherein some of the heat of combustion is utilized to keep the valve hot and prevent "freezing" thereof by solidification of metals therein.

Further objects and advantages will become apparent to those skilled in the art as the description proceeds in connection with the accompanying drawings, wherein:

Fig. 4 is a fragmentary vertical sectional view similar to the lower portion of Fig. 2 but illustrating a modified form of construction and taken substantially along the line 4—4 of Fig. 5; and Fig. 5 is a vertical sectional view taken substantially along the line 5—5 of Fig. 4.

Figure 1:
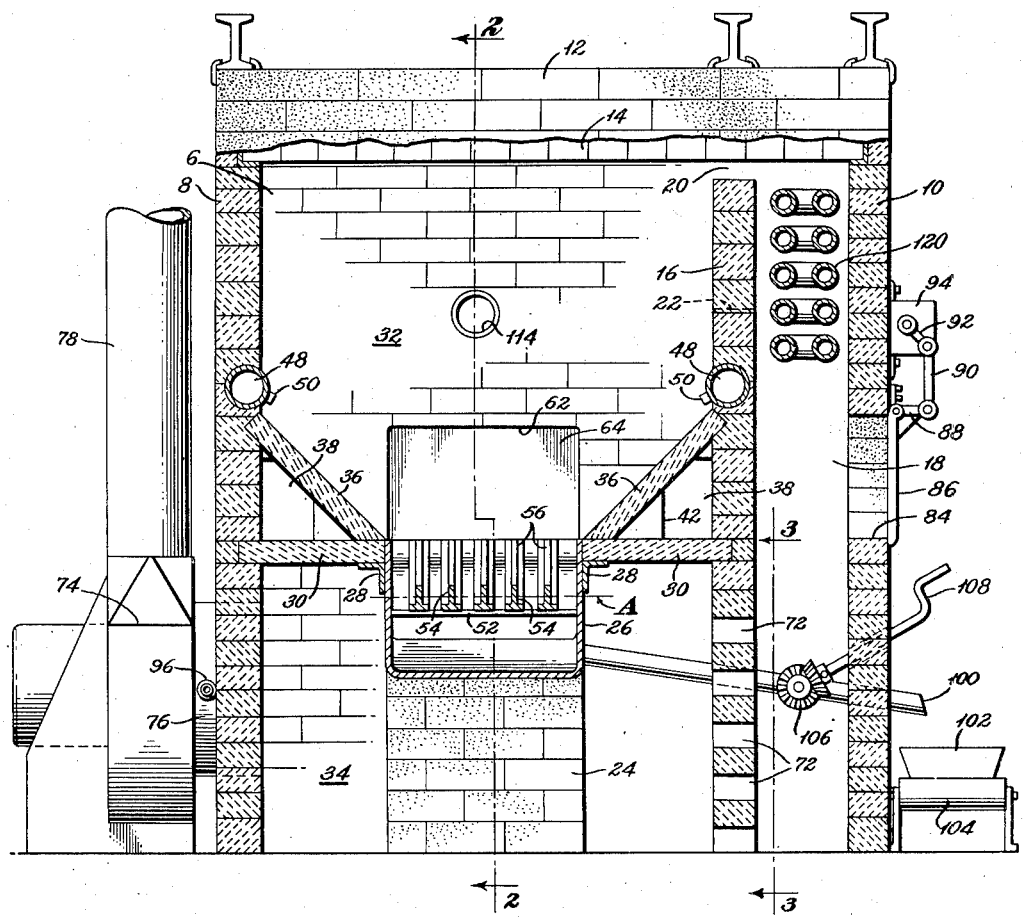
Fig. 1 is a transverse vertical sectional view through a preferred form of furnace according to the present invention, taken substantially along the line 1—1 of Fig. 2.
Figure 2:
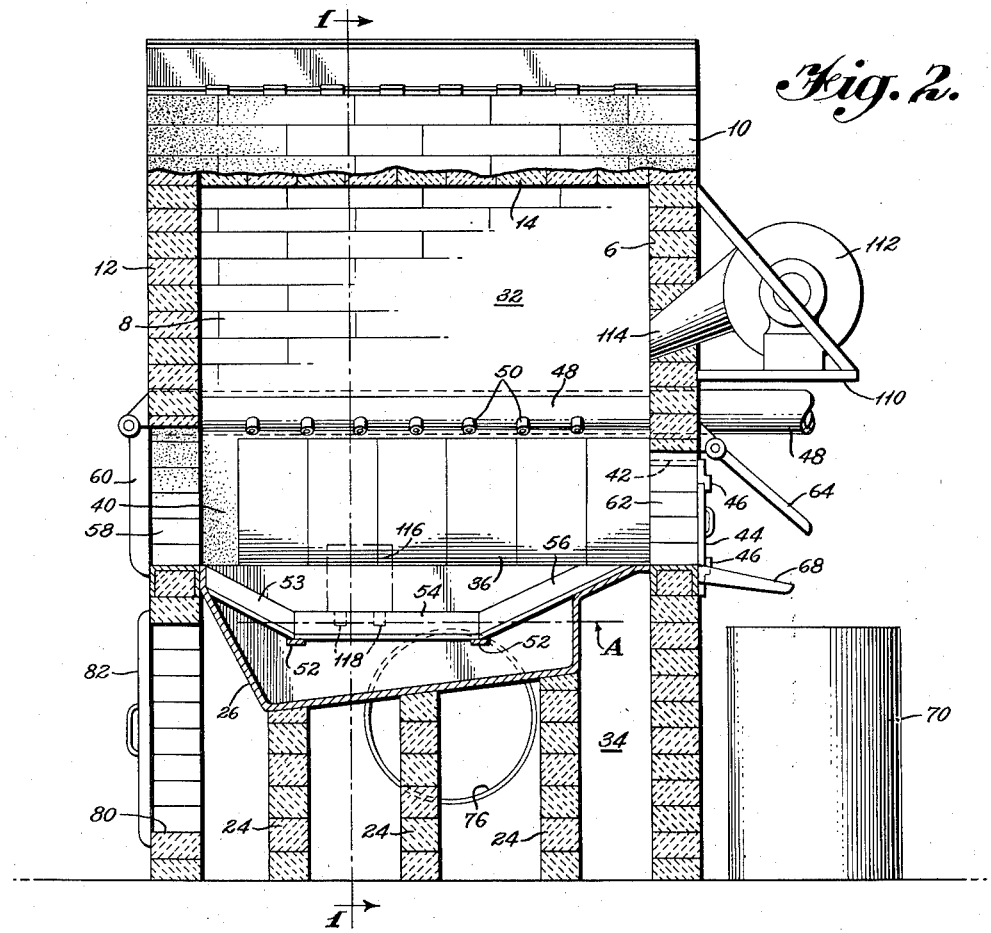
Fig. 2 is a longitudinal vertical sectional view taken substantially along the line 2—2 of Fig. 1 with certain parts being shown in elevation.
Figure 3:
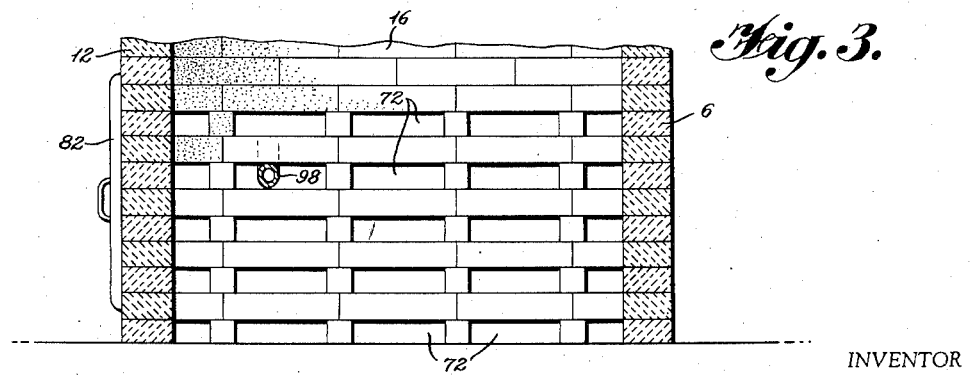
Fig. 3 is a fragmentary vertical sectional view taken substantially along the line 3—3 of Fig. 1.

Referring first to Figs. 1, 2, and 3, a preferred form of the invention is shown and consists of an enclosure or furnace structure comprising a rear wall 6, side walls 8 and 10, a front wall 12, and a top 14. All of the walls and the top are constructed of a suitable fire brick and preferably of a chrome fire brick which is not attacked by sulfuric acid. It is to be remembered that the storage batteries reclaimed in this furnace are first drained of all acid solution but some residual sulfuric acid will remain in the battery cases after such draining. The top 14 may be of any conventional or desired construction such as the suspended arch type indicated in the drawings. The enclosure defined by the walls 6, 8, 10, and 12, and the top 14, is divided by a vertical partition 16 into a large space to the left of the partition 16 as seen in Fig. 1, and a relatively narrow passageway 18 between partition 16 and side wall 10. The partition 16 extends from the front wall 12 to the rear wall 6 but its upper edge is preferably spaced slightly from the top 14, as indicated at 20 and the rearmost portion of the partition 16 adjacent rear wall 6 may be of lesser height than the rest of the partition, as indicated by dotted line 22 of Fig. 1.

A plurality of pillars or supporting structures 24, also constructed of the chrome fire brick, extend upwardly from the floor of the enclosure in the large space to the left of partition 16 and support a stainless steel collecting pan 26. The pan 26 is of less width than the space between partition 16 and wall 8 but extends from the front wall 12 to the rear wall 6 generally centrally of the space. Suitable angle supports 28 may be welded to the exterior of the side walls of collecting pan 26 and serve to support the inner edge portions of baffles 30. The baffles 30 are also constructed of the chrome fire brick material and are supported at their outer edges by the wall 8 and partition 16, respectively. The baffles 30 extend the full distance from the front wall 12 to the rear wall 6 and complete a generally horizontal partition dividing the heretofore mentioned large space into an upper combustion chamber 32 and a lower heating chamber 34. Additional upwardly inclined baffles 36 rest at their inner edges on the innermost portions of the baffles 30 adjacent the collecting pan 26 and extend upwardly and outwardly therefrom to the side wall 8 and partition 16, respectively, and define, with those walls and the baffles 30, longitudinally extending air conduits 38. The baffles 36 extend from the rear wall 6 to a position spaced from the front wall 12 (Fig. 2) to thus define a communication between the conduits 38 and the combustion chamber 32 at 40. The rearmost end of each conduit 38 terminates in an air inlet opening 42 through the rear wall 6 of the furnace. The openings 42 are provided with sliding doors 44 (Fig. 2) mounted in suitable guides 46 and may be manipulated to control the effective opening for admitting air into the conduits 38.

The side wall 8 and partition 16 are also provided with longitudinally extending conduits 48 extending outwardly through the rear wall 6 but closed at their ends adjacent front wall 12. The conduits 48 are provided with a plurality of nozzles 50 directed generally toward the lower central portion of the combustion chamber 32. Although nozzles as such are shown here, it is to be understood that the conduits 48 may be provided with simple openings through the side wall thereof instead of projecting nozzles and reference to "nozzles" hereafter and in the claims is intended to include such openings or equivalent means. The rearwardly extending exterior portions of the conduits 48 are connected to a suitable source (not shown) of air and act to conduct and project the air onto the burning battery cases where turbulence is caused.

A pair of transverse supports 52 extend across the inside of the collecting pan 26 and are welded at their ends to the side walls of the collecting pan. The supports 52 support the rearward ends of downwardly and rearwardly inclined spaced parallel rails 53 of generally inverted T shape. The rails 53 are welded to the uppermost edge of the forward portion of the pan 26 and are also welded at their rearmost ends to horizontally extending rails 54 which span the space between supports 52 and are welded thereto. Upwardly and rearwardly inclined inverted T shaped rails 56 are welded to the rearmost ends of the rails 54 and extend to and are welded to the upper rearmost edge of the pan 26, all as clearly indicated in Fig. 2. If desired, the rails 53 and 56 may be also welded to the transverse supports 52.

The front wall 12 of the furnace is provided with an opening 58 defining an inlet door for storage batteries and is closed by a pivoted door 60 of any suitable design. The opening or doorway 58 extends upwardly from a position level with the forward upper edge of collecting pan 26 and is of a suitable height and width to conveniently receive the storage batteries. The rear wall 6 of the furnace is provided with an opening 62 at the rearmost edge of pan 26 and extending upwardly therefrom and is closed by a suitably hinged door 64. The door 64 is shown in its open position in Fig. 2 merely to facilitate showing the air inlet control door 44. A suitable spout or apron 68 may be attached to the outer side of the rear wall 6 to direct dross material to a collecting can 70.

That portion of partition 16 below the generally horizontal partition defined by collecting pan 26 and baffles 30 is of open checkerboard construction (see also Fig. 3) providing a multiplicity of openings 72 therethrough to establish connection between the narrow passageway 18 and the heating chamber 34. A suitable exhaust fan 74 is mounted adjacent the wall 8 and is connected by a duct 76 extending through the wall 8, with the heating chamber 34. The duct 76 constitutes the inlet of the fan or blower 74 which discharges into an exhaust flue 78.

If desired, the front wall 12 of the furnace may be provided with a service opening 80 (Fig. 2) normally closed by any suitable closure such as shown at 82.

The side wall 10 of the furnace is provided with an opening 84 (Fig. 1) constituting an air inlet and which is closed by a hinged door 86 provided with an outwardly extending integral link 88. The link 88 is pivoted to an upwardly extending link 90 which, in turn, is pivoted to a crank arm 92 mounted on a shaft driven by a control motor (not shown) in housing 94. A thermo-couple 96, or equivalent temperature responsive means, is mounted in the inlet duct 76 of exhaust fan 74 and is connected by a suitable circuit (not shown) to the control motor in housing 94 to automatically regulate the opening of door 86 in accordance with the temperature of the exhaust gases, for a purpose to be described later.

A molten metal conducting pipe 98 extends from the collecting pan 26 through the partition 16 and side wall 10 to the exterior of the furnace where its discharge end portion 100 may deliver molten metal to a suitable mold 102 on a conveyor or the like 104. A control valve 106 controls the pipe 98 and is provided with a manually operable remote control mechanism 108 whereby the valve 106 may be opened or closed at will from the exterior of the furnace. It is to be noted that the valve 106 is located in the narrow passageway 18 between partition 16 and side wall 10.

A bracket 110 (Fig. 2) supports an oil burner 112 of any suitable construction, arranged to direct its flame through a director 114 into the combustion chamber 32. The means 112 is shown and described as an oil burner, but any other suitable heat source may be employed.

The method of operating the furnace thus far described is as follows:

The burner 112 is set into operation and caused to direct its heat into the combustion chamber 32 to bring all components of the combustion chamber to a sufficiently high temperature to ignite the combustible materials of battery cases. After the furnace has been so heated, discarded storage batteries are fed through the doorway 58 onto the rails 53 and 54 to be exposed to the heat in the combustion chamber. If necessary, the burner 112 may be continued in operation until the first batch of batteries starts to burn but after combustion of the battery cases is well under way, the burner 112 may be shut off. The discarded storage batteries are preferably fed to the furnace as shown in dotted lines in Fig. 2 at 116 with their terminal lugs 118 projecting downwardly between the vertically extending portions of the rails 53 and 54. It will be obvious that burning of the combustible materials of the storage battery cases will heat the entire battery sufficiently to melt all the metallic lead therein and the thus melted lead may drip through the space between the supporting rails into collecting pan 26. The batteries may be substantially continuously fed to the furnace through the opening 58 and the ash or dross forms a layer on the surface of the molten lead in pan 26 to prevent oxidation thereof. During operation of the furnace the molten lead, or other metal in collecting pan 26, is maintained substantially at the level indicated by dotted line A in Figs. 1 and 2 so that the terminal lugs 118 of the storage batteries project into the body of molten metal and their melting is thus facilitated. As the solid dross accumulates on the surface of the molten metal the excess may be raked or scooped out of the opening 62 in the rear wall 6 into collecting pan 70. The "ash" materials resulting from burning battery cases includes recoverable compounds of lead and antimony which may be further processed to recover those metals.

After the furnace has been brought up to operating temperature by the burner 112 and batteries have been introduced into the combustion chamber, the exhaust blower 74 is started and withdraws air and gases from the heating chamber 34, thus inducing flow of gases from the combustion chamber over the top of partition 16, downwardly through passageway 18, through openings 72 in partition 16 and about the exposed portions of collecting pan 26. The exhaust blower 74 thus also induces flow of air through openings 42 and through conduits 38 into the combustion chamber 32 at a position over the burning battery cases. The air entering through conduits 38 is preheated by contact with the hot baffles 30 and 36 and radiation therefrom before delivery into the combustion chamber, thus preventing "cold shots" on the burning battery cases, which would cause smoky burning thereof.

The hot products of combustion from combustion chamber 32 are, as previously described, directed to the heating chamber 34 and there serve to heat collecting pan 26 and maintain the molten metal therein in a melted state without danger of premature solidification.

Since the heat produced by burning the battery cases is many times that necessary to melt the lead, some of the excess heat may be removed by a heat exchanger 120 placed in the passageway 18. The heat thus removed may be used for concentration of the drained sulfuric acid or for any other desired purpose.

It is desirable to maintain a fairly constant temperature in the heating chamber 34 and to this end the thermocouple 96 controls the opening of door 86 to admit the necessary volume of cool air to the passageway 18 and thus temper the hot gases flowing through the heating chamber 34. It is desired that the temperature of the gases in the heating chamber 34 be maintained at about 800° F.

To maintain the level of the liquid metal in the pan 26 at about the height indicated by line A, it is necessary to periodically withdraw part of the melted metal. The valve 106 may be manipulated when desired to permit flow of the melted metal through pipe 98 to successive molds 102 which may be progressively moved past the discharge end 100 of pipe 98 by means of a suitable conveyor 104. By positioning the valve 106 in the passageway 18 where it is exposed to the hot gases therein, all metal remaining in the valve or the pipe 98 is maintained in the molten state without causing "freezing" of the valve 106 by solidification of metal therein.

The modification illustrated in Figs. 4 and 5 differs from that of Figs. 1 to 3 in that the metal collecting pan 112 extends not only from the front wall 12 to the rear wall 6 but also extends laterally from the side wall 8 to the partition 16. The collecting pan 122 is provided with a spout 124 leading to a reservoir 126. A metal withdrawing pipe 128 extends from the reservoir 126 through the partition 16 and side wall 10 to conduct molten metal to the exterior of the furnace for suitable disposition. The pipe 128 is provided with a remotely controlled valve 130 located in the vertical passageway 18. In this modification fire brick baffles 132 and 133 extend from the sides of the combustion chamber inwardly toward the center thereof, and the baffles 133 are supported at the innermost edges by hook-shaped hangers 134 suspended from the upper edges of grate bars 136. The hangers 134 may be welded to the grate bars, if desired. The grate bars are supported at their forward and rearward ends in the walls 12 and 6, respectively, in the inclined position shown in Fig. 4. Baffles 138 extend upwardly and outwardly from the grate bars 136 to the wall 8 and partition 16, respectively, to define, with the baffles 133, air inlet conduits 140. The conduits 140 communicate at their forward ends with openings 142 through the front wall 12 of the furnace and the openings 142 are controlled by slide doors 144 to regulate the volume of air admitted to the combustion chamber. The baffles 138 extend all the way from the front wall 12 to the rear wall 6 but the baffles 132 and 133 extend from the front wall 12 to a position spaced inwardly from the rear wall 6 (Fig. 4) and thus provide an arrangement for admitting air to the furnace below the grate bars 136. The air thus introduced moves upwardly through the grate bars and about the battery cases supported thereon to support combustion. Solid dross material will collect on the grate bars and may be removed through the opening 62 in rear wall 6. Some of the dross material falls through the grate and is carried to the reservoir 126 where it forms a protective layer for the molten lead. As batteries are pushed through opening 58, those already burning on the grate are pushed rearwardly and carry most of the dross with them toward opening 62. The mode of operation of this modification is identical to that described in connection with Figs. 1 to 3, and parts bearing like reference numerals are substantially identical in the different embodiments.

As an alternative to the specific form shown in Figs. 4 and 5, the pan 122 could be made deeper than shown, pipe 124 eliminated, and pipe 128 connected directly to 122, much as shown in Figs. 1 and 2.

Throughout all modifications it is intended that all metal parts exposed to the combustion chamber or products of combustion be of stainless steel or equivalent material resistant to the corrosive materials present and of a higher melting point than the metal being recovered.

While the foregoing description is limited to the processing of discarded storage batteries for the recovery of lead, such description is merely illustrative and not limiting. Clearly, the invention can be employed for the recovery of any metal from articles containing enough combustible material to supply sufficient heat to melt the contained metal.

A limited number of embodiments have been shown and described herein but it is to be understood that other modifications may be resorted to without departing from the invention as defined in the appended claims.

I claim:

1. The method of reclaiming lead from storage batteries, comprising the steps of; burning the combustible materials in said battery cases, applying the heat produced by said burning to the storage battery materials to thereby melt the metallic lead in said batteries, supplying said cases with air for combustion, projecting a jet of air onto said burning cases with sufficient velocity to cause turbulence of gases about said cases and smokeless and odorless burning thereof, collecting melted metallic lead from said batteries in a body below said burning cases, and conducting hot gases produced by said burning into heat transfer relation to said body of melted lead to maintain said body in a molten state.

2. The method defined in claim 1, including the step of depositing ash materials from said burning batteries on the surface of said body of melted lead to minimize oxidation thereof.

3. The method defined in claim 1, including the step of supporting said batteries, while burning, with their terminal lugs projecting downwardly into said body of melted lead.

4. The method of reclaiming lead from storage batteries, comprising the steps of; (supporting said batteries at a predetermined level,) burning the combustible materials in said battery cases, applying the heat produced by said burning to the storage battery materials to thereby melt the metallic lead in said batteries, reflecting heat radiated from said burning cases back thereto, supplying said cases with air for combustion, substantially confining said air and products of combustion to a space above said predetermined level, collecting melted metallic lead from said batteries in a body below said predetermined level, and conducting hot gases from said space into heat transfer relation to said body of melted lead to maintain said body in a molten state.

5. The method defined in claim 4, including the step of withdrawing hot gases from said space at a rate sufficient to maintain a sub-atmospheric pressure therein.

6. The method of reclaiming lead from storage batteries, comprising the steps of; burning the combustible materials in said battery cases, applying the heat produced by said burning to the storage battery materials to thereby melt the metallic lead from said batteries, supplying said combustible materials with air for combustion, projecting a jet of air onto said burning material with sufficient velocity to cause turbulence of gases about said materials and smokeless and odorless burning thereof, and collecting metallic lead melted from said batteries in a body therebelow.

7. The method defined in claim 6 including the step of conducting some of the heat from combustion of said materials to said body of melted lead to maintain the same in a molten condition.

8. The method of reclaiming lead from storage batteries, comprising the steps of; (supporting lead-containing battery materials at a predetermined level,) burning the combustible materials from said battery cases, confining the heat produced by said burning to the space around said batteries to melt the metallic lead in said batteries, reflecting heat radiated from said combustible materials back onto said lead-containing materials, supplying said combustible materials with air for combustion, substantially confining said air and products of combustion to a space above said predetermined level, directing lead melted from said batteries downwardly from said level, and collecting melted lead in a body below said level.

9. The method defined in claim 8 including the steps of advancing said battery materials along a generally horizontal path at said level while supplying fresh materials thereto at one end of said path, and collecting unburned materials at the other end of said path.

References Cited in the file of this patent

UNITED STATES PATENTS

| | | |
|---|---|---|
| 728,459 | Harrison | May 19, 1903 |
| 1,804,054 | Hayward | May 5, 1931 |
| 2,462,256 | Charman et al. | Feb. 22, 1949 |

FOREIGN PATENTS

| | | |
|---|---|---|
| 175,481 | Germany | Oct. 4, 1906 |
| 388,625 | France | June 5, 1908 |

OTHER REFERENCES

Trinks: 1942 Industrial Furnaces, vol. II, pp. 199–200.

Engineering and Mining Journal, pp. 81–83, vol. 145, No. 3, March 1944.